(No Model.)
W. D. HODGKINSON.
HAULAGE CLIP.
No. 497,664. Patented May 16, 1893.
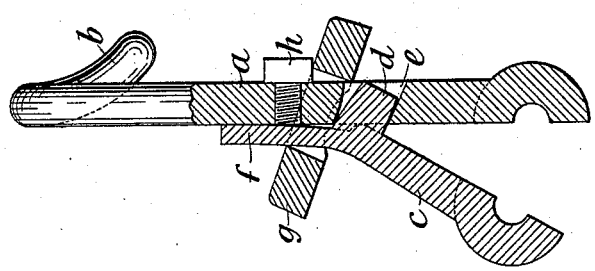
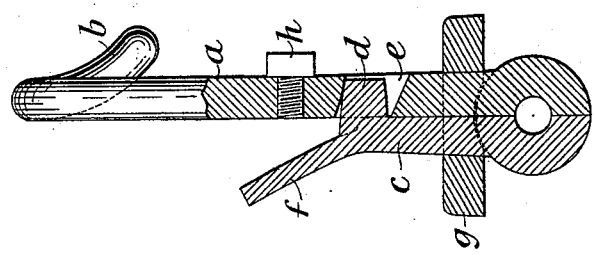
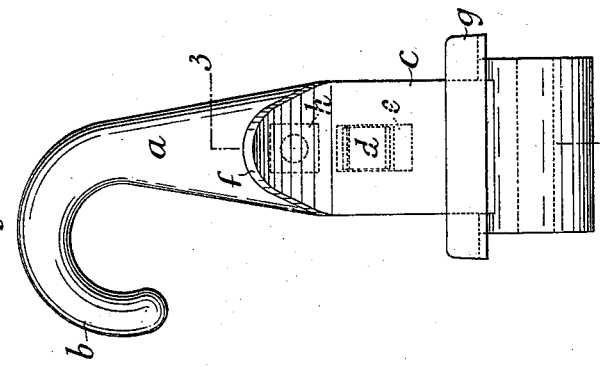
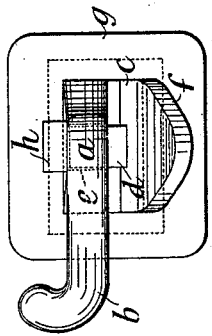
Witnesses
Inventor
William D. Hodgkinson
by Fetherstonhaugh & Co
Attys.

UNITED STATES PATENT OFFICE.

WILLIAM DENNIS HODGKINSON, OF NEWTHORPE, ENGLAND.

HAULAGE-CLIP.

SPECIFICATION forming part of Letters Patent No. 497,664, dated May 16, 1893.

Application filed January 25, 1893. Serial No. 459,714. (No model.)

*To all whom it may concern:*

Be it known that I, WILLIAM DENNIS HODGKINSON, a subject of the Queen of Great Britain, residing at Newthorpe, Nottinghamshire, England, have invented a new and useful Improved Haulage-Clip, of which the following is a specification.

My invention relates to an improved clip or gripper for use in connection with rope-haulage systems in collieries and other places. Hitherto such clips, which have been provided with a hanging or fast side or jaw and a loose or movable side or jaw, have had the two jaws connected by means of a hinge-joint, the said jaws being held in their closed position by means of a link or collar. In operating such a clip it is necessary to employ both hands, viz., one for lifting the link or collar and the other to pull the movable jaw away from the fixed jaw to introduce or release the rope. Also if the clip becomes damaged it is frequently necessary to disconnect the parts at the hinge-joint before they can be repaired, or if the clip is repaired without disconnecting the parts to place the whole clip in the fire.

The object of my invention is to construct a haulage clip which can be readily operated by one hand and which in case it becomes damaged can have its parts readily disconnected for repairs.

According to my invention the fixed side of the clip has formed in it a hole into which a lug on the loose side enters, and the upper end of the loose side is formed with a lever extension which, when the clip is closed upon the rope, projects outwardly but which, when the ordinary link or collar which retains the two parts of the clip together is lifted, is acted upon by the said link or collar in such a manner as to move the loose jaw to open the clip. Or when the collar is raised the finger may be pressed against the said lever extension to move the loose jaw. To prevent the link or collar from being lifted too far and thereby allowing the loose part of the clip to become detached I provide a stud or bolt upon the fast part of the clip, which stud or bolt forms a stop for the said link or collar.

To enable my invention to be fully understood I will describe the same by reference to the accompanying drawings, in which—

Figure 1 is a side elevation of my improved clip; and, Fig. 2 is a plan of the same. Fig. 3 is a section on the line 3—3, Fig. 1; and, Fig. 4 is a view similar to Fig. 3 but showing the clip open.

$a$ is the hanging or fast side or jaw of the clip which at its upper end is provided with a hook $b$ for attaching the clip to the wagons and which at its lower end is formed with the ordinary semi-circular groove in which the rope fits. $c$ is the loose part or jaw of the clip provided with the lug $d$ entering a hole $e$ in the part $a$ of the clip and provided at its lower part with a semi-circular opening corresponding with that in the part $a$. $f$ is the lever which forms an extension of the upper part of the jaw $c$, and $g$ is the usual link or collar which fits over the two parts and serves to hold them together upon the rope. $h$ is the bolt or stop which limits the upward movement of the collar $g$. With this arrangement it will be readily understood that as the link or collar is moved from the position shown in Fig. 3 to that shown in Fig. 4 it will act upon the lever $f$ and open the clip, as shown in the said figure. It will also be understood that while the stop $h$ is in the position shown the link or collar cannot be raised sufficiently to allow the part $c$ of the clip to become disengaged from the part $a$ but that if the said stop $h$ is removed the link or collar can be raised sufficiently to allow the parts to be disconnected. This disconnection of the parts I consider to be of great advantage as in case either part of the clip becomes bent or strained it can be readily disconnected and repaired.

Having now particularly described and ascertained the nature of my said invention and in what manner the same is to be performed, I declare that what I claim is—

1. A haulage clip comprising a rigid part, a hook at its upper end, a semi-circular jaw at its lower end, a diagonal perforation and a screw-threaded perforation, a screw $h$ adapted to engage said screw-threaded perforation; a movable part, an outwardly extending arm at its upper end, a semi-circular jaw at its lower end, and a lug adapted to engage the diagonal perforation, and a collar surrounding said parts, whereby, when the collar is moved downward the semi-circular jaws register and are adapted to receive a rope, and when moved upward to engage the screw $h$, and extended arm, and thereby release said rope, substantially as described.

2. In combination, the main portion having a perforation, the movable portion provided with a lug engaging said perforation and having an angular extended arm on its rear end, a collar surrounding said parts, and a stop on the main portion for engaging the collar, substantially as described.

WILLIAM DENNIS HODGKINSON.

Witnesses:
ROBERT BARBER,
*Fletcher Gate, Nottingham, Solicitor.*
ALBERT E. SAMUEL,
*97 Mansfield Road, Nottingham, Solicitor's Clerk.*